United States Patent
Stinnesbeck

[19]

[11] Patent Number: 6,014,857
[45] Date of Patent: Jan. 18, 2000

[54] HIGH FUEL REGRESSION HYBRID ROCKET MOTOR

[76] Inventor: Thomas L. Stinnesbeck, Fockenbachstr. 10, 53547 Hummerich, Germany

[21] Appl. No.: 08/980,054

[22] Filed: Nov. 26, 1997

[30] Foreign Application Priority Data

Dec. 5, 1996 [DE] Germany ..................... 196 50 411
Dec. 5, 1996 [DE] Germany ..................... 296 21 110 U

[51] Int. Cl.$^7$ ........................................ F02K 9/72
[52] U.S. Cl. ............................... 60/251; 60/258
[58] Field of Search ................ 60/251, 253, 254, 60/257, 258

[56] References Cited

U.S. PATENT DOCUMENTS

| | | | |
|---|---|---|---|
| 3,142,152 | 7/1964 | Sessums, Jr. ........................ | 60/251 |
| 3,166,898 | 1/1965 | Hoeptner ............................. | 60/251 |
| 3,177,657 | 4/1965 | Strauss et al. ....................... | 60/251 |
| 3,203,174 | 8/1965 | Sutherland .......................... | 60/251 |
| 3,315,472 | 4/1967 | Moutet et al. ....................... | 60/251 |
| 3,434,287 | 3/1969 | Caveny ................................ | 60/251 |
| 3,457,727 | 7/1969 | Munger ................................ | 60/251 |
| 3,789,610 | 2/1974 | Stone .................................. | 60/251 |
| 4,442,666 | 4/1984 | Vetter .................................. | 60/253 |

FOREIGN PATENT DOCUMENTS

4422195   9/1995   Germany .

*Primary Examiner*—Ted Kim
*Attorney, Agent, or Firm*—Kenyon & Kenyon

[57] ABSTRACT

A hybrid rocket motor having a multitude of radially inward directed miniature hybrid secondary combustion chambers within a single solid fuel block being oxidizer-fed by a single centrally positioned distributor and a system of radially outward-directed feed tubes. The feed tubes are sealed at their distant ends and have multiple orifices opening into the secondary combustion chambers to resemble a multitude of secondary conventional-injection hybrid motors within a single main hybrid motor.

8 Claims, 2 Drawing Sheets

HIGH FUEL REGRESSION HYBRID ROCKET MOTOR

FIELD OF THE INVENTION

The present invention relates to rocket motors, and in particular to a high fuel regression hybrid rocket motor.

BACKGROUND INFORMATION

The problems of construction of high-thrust hybrid rocket motors have been described extensively in numerous patents dealing with the subject, such German Patent No. DE 44 22 195 of the present applicant, as well as in secondary literature, such as George P. Sutton, Rocket Propulsion Elements, 6th edition, 1992, John Wiley & Sons, pp. 502. One problem is maximizing fuel regression, i.e., the amount of solid fuel which can be made available for the combustion process per time unit. This amount determines the rocket motor's maximum thrust.

Several injection systems for hybrid rockets have been proposed (but none built) which are designed to make the combustion process in the hybrid rocket's motor more closely resemble that of a standard solid fuel motor, where oxidizer and fuel are thoroughly mixed. These injection systems are designed around the idea of conducting the oxidizer through the fuel to the fuel block surface via a multitude of channels, as in U.S. Pat. Nos. 3,177,657, 3,142,152, or German Patent No. DE 44 22 195, or, in some cases, by creating a porous fuel block which can be flooded with oxidizer, as in U.S. Pat. No. 3,203,174. U.S. Pat. No. 3,166,898 suggests injecting the oxidizer into the gap between several cylindrical fuel block segments which are spaced apart.

None of the above have been experimentally verified. Porous designs carry the negative of uncontrolled explosion. The design in U.S. Pat. No. 3,166,898 raises the difficulty of affixing said segments to the motor case, in particular when the fuel block burns out, as well as creating combustion instabilities.

It may be assumed that the injection system proposed in U.S. Pat. No. 3,177,657 and German Patent No. DE 44 22 195 will increase regression rates by creating multiple flame fronts directly on or very near the solid fuel's surface, leading to an increased evaporation of solid fuel. However, until experimentally proven, this remains an assumption. It has been sufficiently demonstrated, however, that fuel regression in hybrids correlates directly with the solid fuel surface area (provided mixing of oxygen and evaporated fuel is thorough and thus combustion efficient). U.S. Pat. No. 3,177,657 and German Patent No. DE 44 22 195 provide for a substantially increased solid fuel surface area. Various port designs are known from solid rockets, such as the star, dendrid, dog bone, etc. A simple port design, however, primarily a cylinder, would be preferable.

A design as described in U.S. Pat. No. 3,177,657 with multiple tubes within the fuel block is rather difficult to construct and to check out, making reusable engines particularly difficult to build. In the present applicant's own experiments, a design as in German Patent No. DE 44 22 195, in which holes are drilled through the fuel block instead of placing tubes in the fuel block (assuming that the fuel-oxidizer combination is not hypergolic), has displayed a significant weakness in the form of oxidizer leakage in between the motor casing and the fuel block, carving out cavitations and ultimately leading to motor case burn-through failure. The experiments have demonstrated that this adverse behavior is hardly preventable, as the fuel itself tends to expand and bend inward as a sequel of heat stress during the combustion process.

SUMMARY OF THE INVENTION

It is an object of the present invention to provide an improved hybrid rocket motor of the type described in U.S. Pat. No. 3,177,657 and German Patent No. DE 44 22 195 using a simple internal combustion port design, such as a cylinder. The present invention provides a hybrid rocket motor in which multiple radial flow tubes and ducts described in the above patents are substituted by substantially widened individual burn chambers resembling a multitude of radially inward-directed individual micro-hybrid combustion chambers residing within the solid fuel block. These secondary combustion chambers may be full or part length. Oxidizer is injected into each such secondary combustion chamber individually, each secondary combustion chamber resembling in principle a conventional hybrid rocket injection system. As the thrust and combustion behavior of each such secondary combustion chamber can be determined experimentally with reasonable effort, a conclusion as to the thrust of a much bigger motor effectively consisting of a multitude of equally dimensioned secondary combustion chambers seems plausible. Scaling should be possible with a high degree of predictability. The exhaust gas of the secondary combustion chambers will still be oxidizer-rich as they empty into the main combustion chamber such that oxygen will be available at all levels of the main combustion chamber for combustion. It is possible, in a slight variation of the idea, that the secondary combustion chambers within the fuel block don't go full length through the fuel block.

Hybrid rocket thrust is a function of the fuel surface area available for combustion. This surface area determines the overall regression and thus thrust. Since the multitude of secondary combustion chamber substantially increase the fuel surface area beyond the area of the main combustion chamber (typically by 50% and more in the present applicant's own experiments), regression is maximized while preserving a simple combustion chamber design.

The present invention maintains all advantages of the above patents, in particular prevention of gas layering, but without any of their disadvantages, which have become evident in experiments.

Hybrid rocket motors according to the present invention up to medium sizes can be manufactured easily within a few hours, with conventional tools and at low cost.

BRIEF DESCRIPTION OF THE DRAWINGS

FIG. 2b shows a detail of the oxygen distributor portion of the embodiment of the present invention shown in FIG. 2a.

DETAILED DESCRIPTION

Figure 1A:
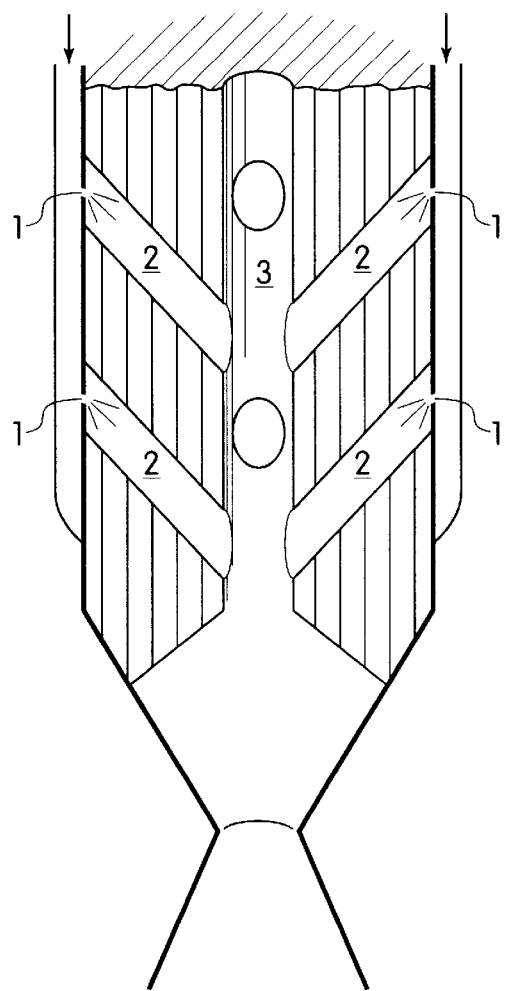
FIG. 1a shows a side cross-sectional view of an embodiment of a portion of a hybrid rocket motor according to the present invention.
Figure 1B:
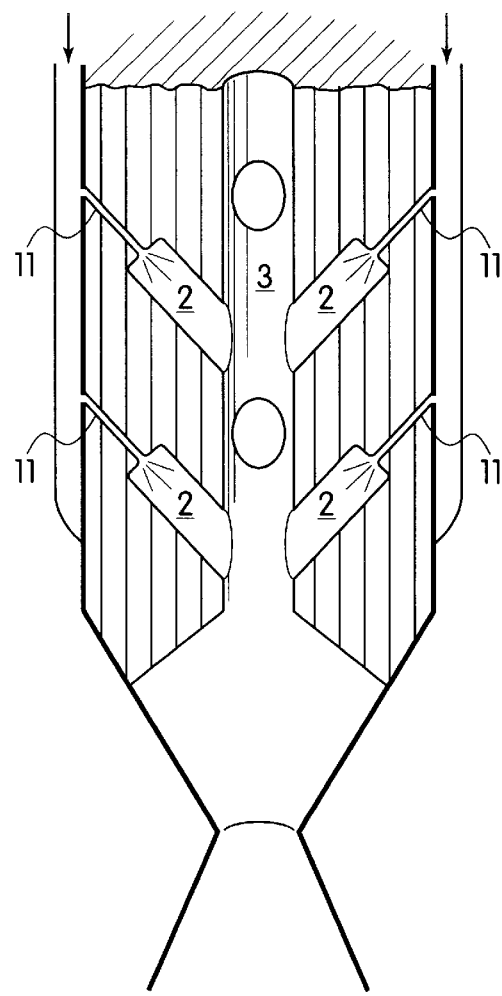
FIG. 1b shows a side cross-sectional view of another embodiment of a portion of a hybrid rocket motor according to the present invention.

FIG. 1a shows an embodiment of the present invention having secondary combustion chambers 2 which fully span fuel block 4 and intersect main combustion chamber 3 at an angle. Injection holes or orifices 1 are provided in secondary combustion chambers 2. FIG. 1b shows another embodiment of the present invention having secondary combustion chambers 2 connected to passages 1 which only partially span fuel block 4.

Figure 2A:
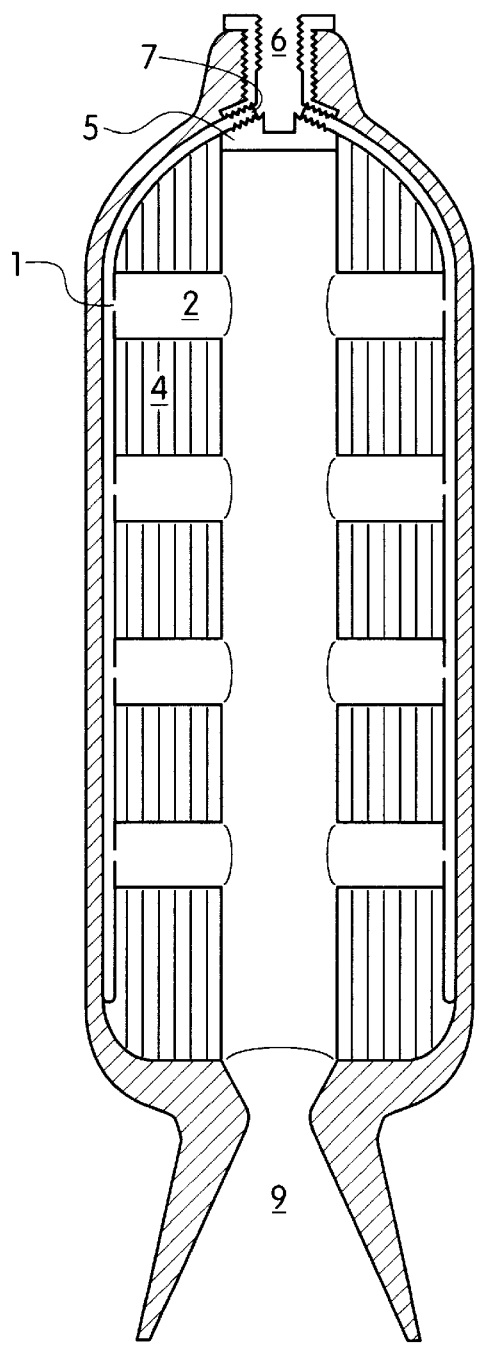
FIG. 2a shows a side cross-sectional view of a third embodiment of a portion of a hybrid rocket motor according to the present invention.
Figure 2B:
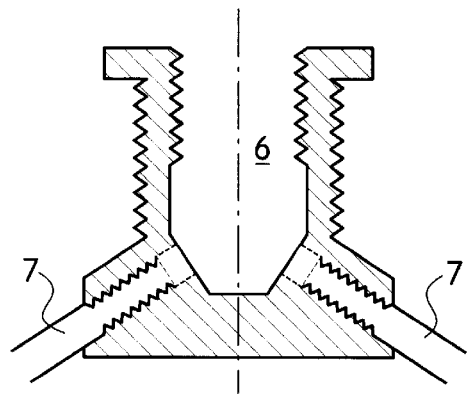

Referring to FIGS. 2a and 2b, the solid fuel block 4 may be manufactured by conventional methods such as extrusion, casting or milling. Next, longitudinal grooves are milled into its outer mantle, designed to accommodate the oxidizer feed lines. The secondary combustion chambers 2 may be manufactured quite simply by milling or drilling through the fuel block, whereby said drill holes originate in the above grooves and going radially inward into the central main combustion chamber. Main oxidizer distributor 5 (drawing 2b) is positioned centrally at the main combustion chamber top end. This distributor is characterized by one central inlet 6 and a number of radially outward-directed outlets, feeding the tubes 7. The lower ends of said tubes are sealed. The tubes are shaped or bent to fit exactly into the grooves in the outer mantle of the fuel block. Each tube has a number of radially-inward pointing holes or orifices 1. These injection holes or orifices 1 must match the secondary combustion chambers when the system of oxidizer distributor and feed tubes is put into place, such that oxidizer is injected more or less (with a high degree of tolerance) centrally into the secondary combustion chambers. The injection holes may have any of a variety of simple or complex injection orifice designs.

The injection system is permanently installed by fitting the feed tubes into the grooves, where they are glued into place with a suitable glue such as a two-component epoxy. The motor's pressure case 8 is produced as a roving body of carbon, aramid or glass fiber filaments in a plastic binder (such as epoxy resin) matrix by winding said fiber filaments directly onto the solid fuel block and injection system. The process of case manufacturing is well understood. Advantageously, the rocket's converging/expanding nozzle 9 is laminated in the same process as part of the motor case to form an ablatively-cooled rocket nozzle.

For some applications it may be desirable to place and/or laminate thin copper wires into the fuel block, motor case and in particular the nozzle throat to allow burn process monitoring and case/nozzle failure detection.

The above described motor is characterized by simple construction, low cost, ease of manufacturing and high fault tolerance in combination with a high mass ratio. There is only one central oxidizer inlet, as would be in a conventional hybrid.

The present invention has numerous advantages including:

Fuel surface area and thus fuel regression and thrust are maximized as compared to conventional combustion chamber designs. The combination of many similar small secondary combustion chambers within a single solid fuel block allows easy predictability of thrust and linear scaling of motor sizes. The fuel surface area is kept constant during the burn process, as the regressing fuel will increase the overall surface area of the main combustion chamber while the surface area of the secondary combustion chambers is decreased simultaneously via reduction of their length. The present invention furthermore preserves all the advantages of U.S. Pat. No. 3,177,657 and German Patent No. DE 44 22 195, such as prevention of gas layering and constant oxidizer distribution over combustion chamber length while avoiding their disadvantages, such as the complexity of manufacturing and complicated "plumbing" of U.S. Pat. No. 3,177,657, or the motor case failure due to fuel thermal stresses and irregular burn process cavitation of German Patent No. DE 44 22 195.

I claim:

1. A hybrid rocket motor comprising:

a solid fuel block defining:
      a main combustion chamber therein, the combustion chamber defining a first exhaust opening and a first longitudinal axis passing through the first exhaust opening, the combustion chamber conveying combustion gas streams toward the exhaust opening;
      a plurality of tubular secondary combustion chambers therein, the secondary combustion chambers being arranged about the main combustion chamber for exhausting into the main combustion chamber in a direction generally transverse to the first longitudinal axis so as to promote mixing of the combustion gas streams, each of the secondary combustion chambers having a head side and defining on an opposite side a respective second exhaust opening at the main combustion chamber and a respective second longitudinal axis disposed generally transversely to the first longitudinal axis, and each of the secondary combustion chambers having a respective first cross-sectional area generally orthogonal to the respective second longitudinal axis; and
   a respective injection orifice associated with the head side of each of the secondary combustion chambers for injecting oxidizer into the associated secondary combustion chamber in a direction generally transverse to the first longitudinal axis;
   wherein the first cross-sectional area of each secondary combustion chamber is substantially larger than a second cross-sectional area of the respective injection orifice.

2. The hybrid rocket motor of claim 1 wherein the first cross-sectional area of each secondary combustion chamber is at least a factor of approximately ten larger than the second cross-sectional area of the respective injection orifice.

3. The hybrid rocket motor as recited in claim 1 further comprising a motor casing for receiving said fuel block, the motor casing defining the respective injection orifice associated with each secondary combustion chamber.

4. The hybrid rocket motor of claim 1 further comprising a plurality of oxidizer feed tubes disposed in the fuel block, each of the plurality of oxidizer feed tubes defining at least one of the injection orifices.

5. The hybrid rocket motor of claim 4 further comprising:
   an oxidizer distributor including a central inlet disposed at a front end of the rocket motor, the plurality of oxidizer feed tubes each having a front end and a rear end, each front end being connected to the oxidizer distributor and each rear end being sealed, the plurality of oxidizer feed tubes running in a generally outward direction from the oxidizer distributor and running generally parallel to the first longitudinal axis near an outer surface of the fuel block.

6. The hybrid rocket motor of claim 1 wherein at least one of the second longitudinal axes is generally orthogonal to the first longitudinal axis.

7. The hybrid rocket motor of claim 1 wherein at least one of the second longitudinal axes forms an acute angle with the first longitudinal axis.

8. The hybrid rocket motor of claim 1 wherein the fuel block further defines a respective passageway providing communication between each secondary combustion chamber and the respective injection orifice.

\* \* \* \* \*